July 7, 1970 P. FRENCH ET AL 3,519,313
ANTISKID BRAKE CONTROL DEVICE
Filed Jan. 30, 1968 3 Sheets-Sheet 1

INVENTORS
PARK FRENCH
HAROLD R. SCIBBE
BY Hill, Sherman, Meroni, Gross & Simpson
ATTORNEYS July 7, 1970  P. FRENCH ET AL  3,519,313
ANTISKID BRAKE CONTROL DEVICE
Filed Jan. 30, 1968  3 Sheets-Sheet 3
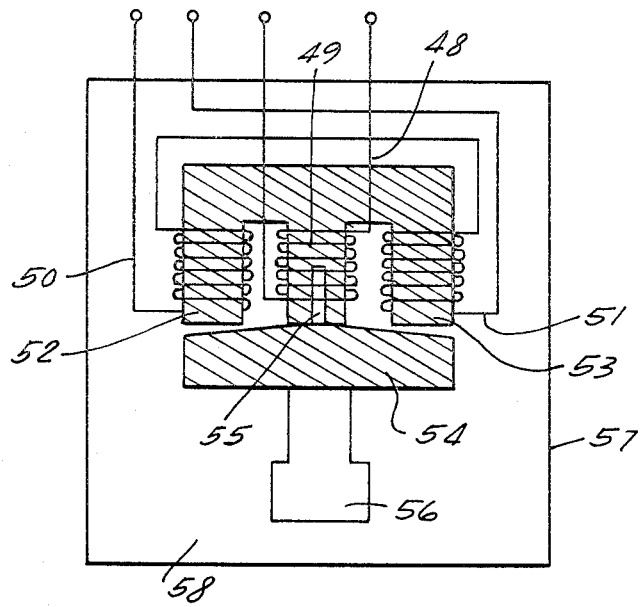
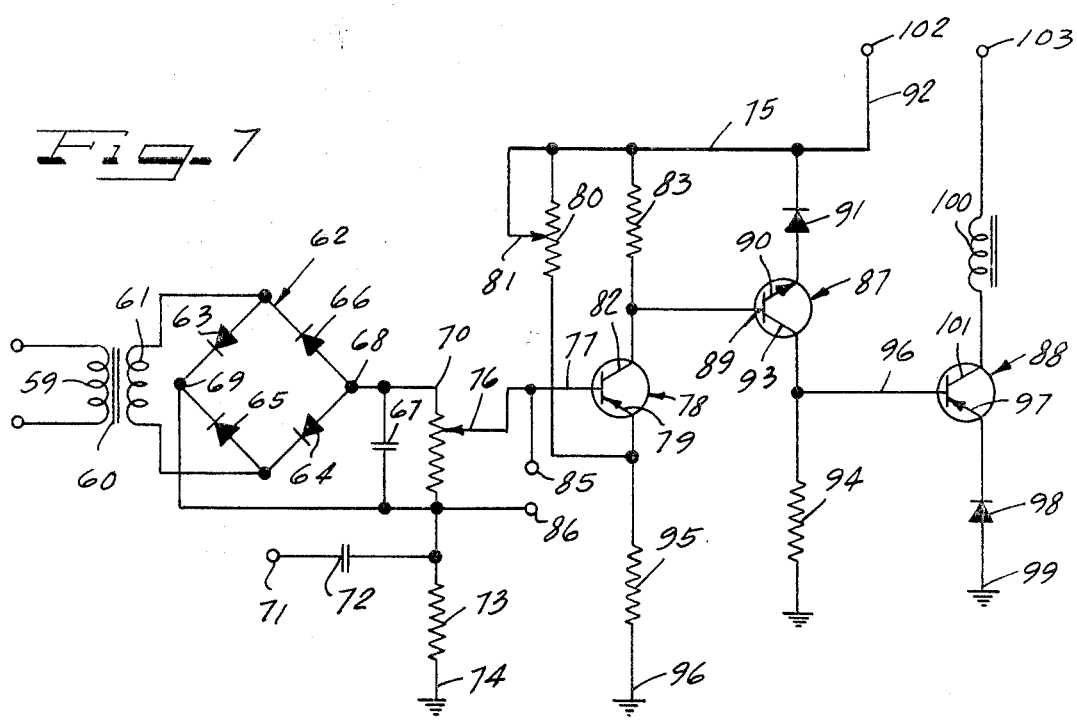
INVENTORS
PARK FRENCH
HAROLD R. SCIBBE
BY ATTORNEYS

United States Patent Office 3,519,313
Patented July 7, 1970

3,519,313
ANTI-SKID BRAKE CONTROL DEVICE
Park French, Aurora, and Harold R. Scibbe, Chardon, Ohio, assignors to TRW, Inc., Cleveland, Ohio, a corporation of Ohio
Filed Jan. 30, 1968, Ser. No. 701,583
Int. Cl. B60t 8/08
U.S. Cl. 303—21                                18 Claims

ABSTRACT OF THE DISCLOSURE

An acceleration control for a vehicle including means for sensing the rate of change of speed of a vehicle wheel, and simultaneously sensing the linear rate of change of speed of the vehicle, comparing the two and generating a control signal for regulating the acceleration of the wheels. A high frequency pulse signal is generated at a rate which is proportional to wheel speed, then filtered and differentiated to develop a DC signal which is proportional to wheel acceleration. Similarly, a linear acceleration sensor detects the acceleration of the vehicle and develops a DC signal which is proportional to vehicle acceleration. The two signals are compared in a differential amplifier, and the resulting amplified difference signal is utilized to regulate the acceleration of the wheels to bring the acceleration of the wheels into an acceptable relationship with the acceleration of the vehicle.

BACKGROUND OF THE INVENTION

Field of the invention

The field of art to which this invention pertains is acceleration control devices, and, in particular, anti-skid brake control devices, anti-skid wheel spin devices, and associated means for regulating the acceleration of a vehicle wheel in keeping with the continually monitored acceleration of the vehicle itself.

SUMMARY

It is an important feature of the present invention to provide an acceleration control device which electronically senses the acceleration of a vehicle wheel, electronically senses the linear acceleration of the vehicle itself, and which electronically compares and utilizes the compared information to control the acceleration of the vehicle wheels.

It is also an important feature of the present invention to develop an acceleration control device for a vehicle where means are provided to generate a DC signal which is proportional to the acceleration of the vehicle wheels and a further DC signal which is proportional to the linear acceleration of the vehicle.

It is an important object of the present invention to provide an improved, more reliable, more effective, and more durable acceleration control device for a vehicle.

It is also an object of this invention to provide an acceleration control which develops a series of pulses having a frequency which is proportional to the vehicle wheel speed and having means for generating a DC signal from said pulses which DC signal is a direct function of wheel acceleration.

It is another object of this invention to provide an extremely accurate and reliable, all electronic device for sensing the linear deceleration of a vehicle, and which device includes a stable oscillator and an inertia operated differential transformer.

It is an additional object of this invention to provide a linear acceleration sensor for a vehicle utilizing a differential transformer which is inertial sensitive and which is unaffected by variation in gravitational signals.

It is a further object of this invention to provide an anti-skid control device having an electronic wheel speed, an acceleration detector and an electronic linear acceleration detector, means for combining the two output signals, and means for developing an amplified difference signal which is usable for controlling the acceleration of vehicle wheels, and wherein the final output signal is developed for affecting the vehicle wheel acceleration only when pressure is applied manually to the braking system.

These and other features, objects and advantages of the present invention will be understood in greater detail from the following description and the associated drawings.

BRIEF DESCRIPTION OF THE DRAWINGS

FIG. 6 shows a mechanical, electrical transducer which takes the form of a differential transformer which is sensitive to acceleration effects;

FIG. 7 is a schematic of an amplifier as well as means for combining the rotational and linear acceleration signals for the purpose of developing an amplified difference or error signal which is then usable for controlling the acceleration of the vehicle wheels.

DESCRIPTION OF THE PREFERRED EMBODIMENT

Figure 1:
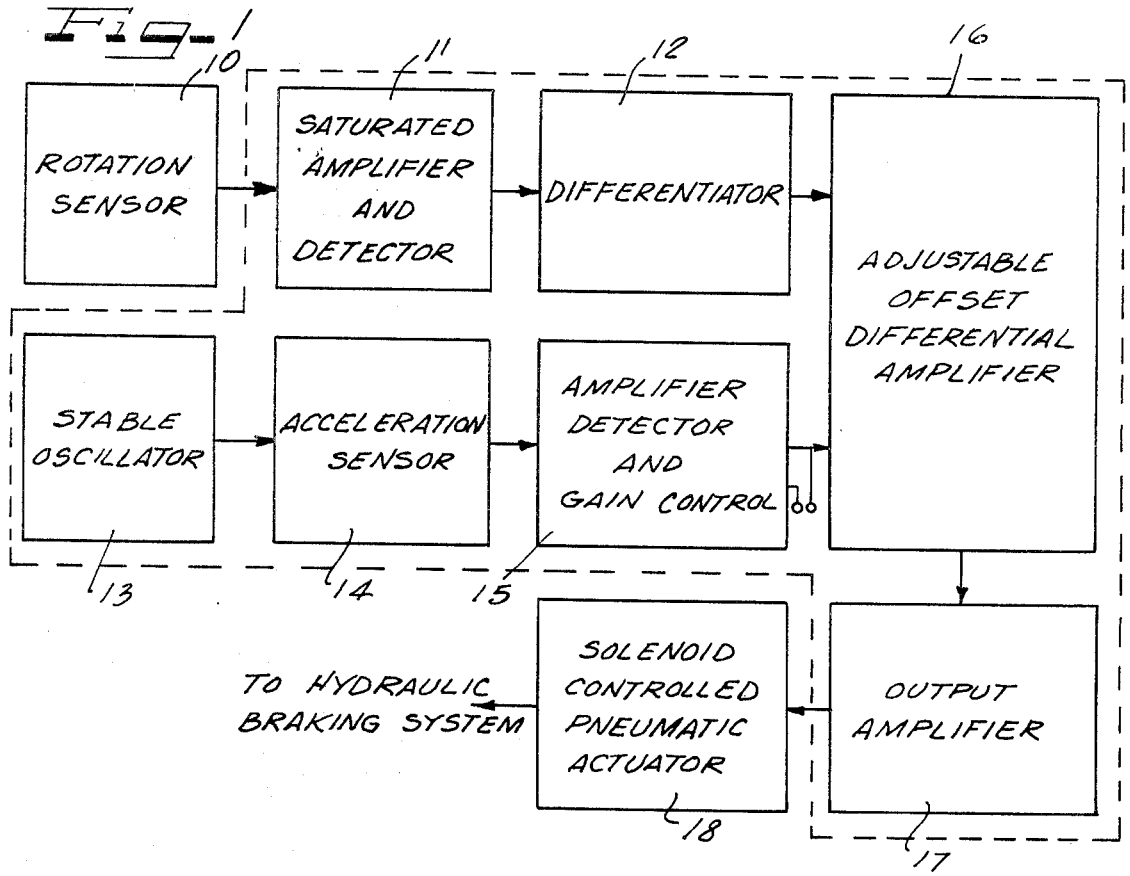
FIG. 1 is a block diagram illustrating the operation of the acceleration control of the present invention.

The acceleration control device as described functionally in FIG. 1 through the use of the block diagram consists of a rotation sensor 10 which is coupled to a saturation amplifier and detector 11 for limiting the amplitude of the sensed wheel speed signal. At the output of the saturation amplifier and detector, there is developed a DC signal which has an amplitude proportional to wheel speed. Since acceleration is the control factor which concerns the present invention, a differentiator 12 is employed to differentiate the output of the detector 11 to obtain a signal which is indicative of the rate of fluctuation of the saturated amplifier and detector output and which, accordingly, is directly related to wheel acceleration.

In this connection, it is important to note that the word "acceleration" is used throughout the course of this application in the general sense of including either positive or negative acceleration. The use of the word in its technical sense of including negative as well as positive acceleration is intended to be an encompassing terminology which covers the anti-wheel skid device which is primarily concerned with negative acceleration or deceleration as well as the anti-wheel spin device which is primarily concerned with positive acceleration. Acceleration, then, refers herein to a rate of change of speed without necessarily implying or imparting a directional rate of change of speed.

The devices 10, 11 and 12 then constitute the rotational acceleration detection systems.

The linear acceleration detection system includes a stable oscillator 13 which is utilized to develop a constant frequency, and constant amplitude signal for use in conjunction with an acceleration sensor 14. The acceleration sensor 14 utilizes the signal developed at the stable oscillator 13 to produce an output signal which is sensitive to the acceleration of the vehicle itself.

The output of the acceleration sensor is coupled to an amplifier detector and gain control 15 which is utilized to generate a substantially DC signal from the high frequency output of the acceleration sensor.

It is also to be noted that when the terminology DC is used herein, it is intended to mean a unidirectional current or voltage which has a constant amplitude for a short period of time. For instance, the output of the detector 11 is essentially a DC signal. However, the level of that DC signal will fluctuate under certain acceleration circumstances, and the differentiator will then develop a signal to indicate a change in the amplitude of the DC signal.

The output of the differentiator 12 and the output of the amplifier detector and gain control 15, then, are two DC signals having amplitudes respectively proportional to the linear and rotational acceleration which may be compared and a difference signal developed and amplified which may then be utilized to control the rate of acceleration of the vehicle wheels. This is accomplished by coupling both the output signals 12 and 15 to an adjustable offset differential amplifier 16. The output of the differential amplifier 16 is coupled to an output amplifier 17 for further amplification and finally to a solenoid controlled pneumatic actuator or the like which may be utilized to release the fluid pressure supplied to the wheel brakes in the case of an anti-wheel skid device, which may be utilized to control the position of the throttle in the case of an anti-wheel spin device.

Figure 5:
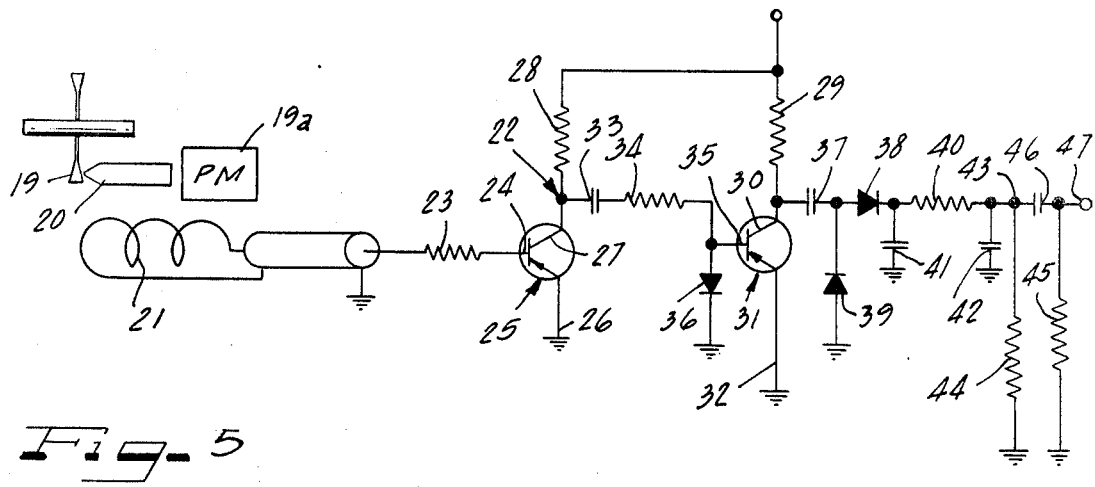
FIG. 5 shows the wheel sensing schematic which includes speed detection as well as the developing of a signal suitable for comparison with a linear acceleration detector.

The rotation sensor identified with the reference numeral 10 in FIG. 1 is shown schematically in FIG. 5.

In particular, a tooth wheel 19 is caused to rotate past an armature of a solenoid device in the presence of a magnetic field produced by a permanent magnet 19a or the like 20 which results in the generation of a series of pulses with the passing of each tooth. A solenoid winding 21 may be said to be a signal source for this purpose, and the signal received in the winding 21 will be similar to the signal shown in FIG. 2.

Figure 2:
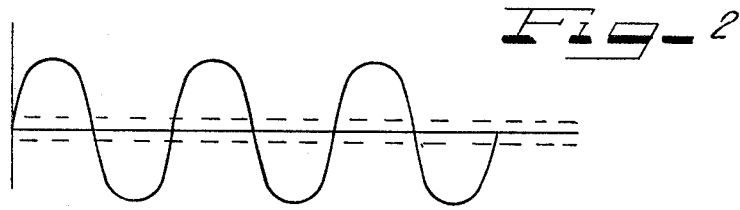
FIG. 2 is a diagram of a waveform illustrating the cyclic operation of the wheel speed sensor of the present invention.
Figure 3:
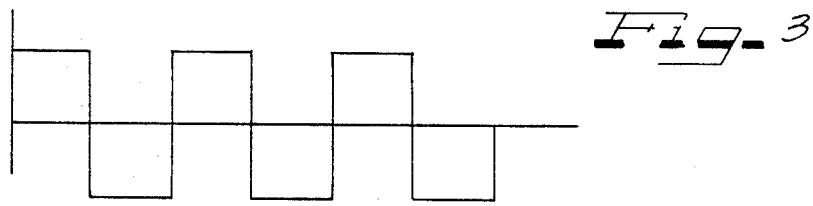
FIG. 3 shows the output voltage of a saturation amplifier of the present invention.
Figure 4:
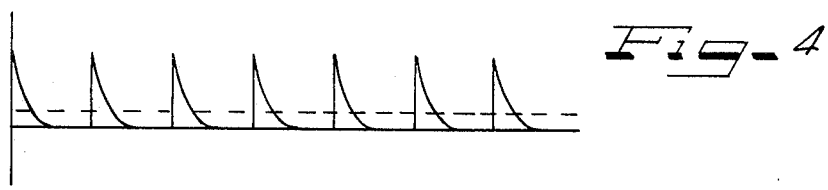
FIG. 4 shows current waveforms at a detector utilized in conjunction with the wheel speed sensing device of the present invention.

Since it is desirable to employ only the information contained in the frequency component of the signal shown in FIG. 2 to obtain a true measurement of rotational speed and since the amplitude is influenced by extraneous factors such as mounting position, magnet age, temperature of the components and mechanical vibration, the output sensor signal as shown in FIG. 2 is passed through a saturation amplifier 22. FIGS. 2 and 3 show the input and output voltages of the amplifier 22, together with the detector currents being shown in FIG. 4. The dotted lines in FIG. 2 show the saturation level of amplifier 22. The dotted lines in FIG. 4 show the average of the detector current at the output of the filters 40–42. These diagrams are, of course, plotted on a horizontal time scale.

The amplifier 22 consists of two simple resistance coupled stages. Both have input provisions to prevent the loading of their respective driving stages and to provide quick recovery from saturation. The waveform of the output voltage is essentially that of a square wave, with frequency equal to the input wave frequency. The only influence of the input amplitude on it is to provide finite sloping of the leading and trailing edges, an effect which becomes vanishingly small at higher frequencies or wheel speeds.

The amplifier 22 includes a resistor 23 which is coupled from the solenoid 21 to the base 24 of a transistor 25. The transistor 25 has its emitter circuit coupled to ground as at 26 and its collector circuit 27 coupled through first and second resistors 28 and 29 to a collector 30 of a transistor 31. The transistor 31 also has its emitter coupled as at 32 to ground. The collector of the transistor 25 is coupled through a capacitor 33 and a resistor 34 to the base 35 of the transistor 33 and hence to ground through a diode 36. The transistors 25 and 31 are driven into saturation with each input pulse, and the resulting output waveform as shown in FIG. 3 is detected and filtered through the remainder of the circuit shown in FIG. 5.

In particular, the output voltage waveform shown in FIG. 3 is coupled to a detection input capacitor 37 and through a pair of diodes 38 and 39 to a pi-shaped filter network including a resistor 40 and a pair of capacitors 41 and 42.

The result is that at a junction point 43, the output waveform shown in FIG. 4 is essentially a DC level, assuming no change in vehicle wheel speed. This DC level is then developed across a pair of resistors 44 and 45 which are coupled together by virtue of a capacitor 46. The output of the circuit as exhibited at circuit junction point 47 then will be a DC voltage which has a changing amplitude with time insofar as the DC level is dependent on changes in the wheel speed of the vehicle.

Since the voltage at the filter output 43 varies directly with wheel speed, wheel accelerations are reflected by time rates of change of this voltage. Except during a very short time interval (corresponding to the filtered time-constant) following a rapid change in speed, the rate of change of voltage bears a fixed proportionality to the rate of change of wheel speed. A simple RC differentiator senses this rate of change of voltage and provides an output proportional to the wheel acceleration. In the circuit shown in FIG. 5, the filter output is positive, so wheel deceleration results in a decrease of voltage with time. This in turn produces a negative voltage output from the differentiator, which is desired. Accordingly, a negative voltage with amplitude proportional to wheel deceleration is achieved.

The circuit for sensing linear acceleration is indicated in FIG. 1, and a linear deceleration sensor in shown in FIG. 6. The block diagram shown in FIG. 1 shows the first element of the linear deceleration or acceleration system to be a stable oscillator. In this connection, it is important to provide an oscillator which assures a constant amplitude at a fixed frequency. These features can be easily obtained with several one or two transistor circuits operated from the same regulated voltage supply used for the wheel acceleration or deceleration circuitry. The voltage control can be provided by a simple Zener diode regulator of the bypass type, employing the 12 volt automobile electrical system as the power source. The output from the oscillator 13, which can be anywhere from 1 to 100 kilocycles as is convenient, is fed to an acceleration transducer such as is shown in FIG. 6. This transducer may be of the null-output type at zero deceleration. It is also important that its output be proportional to the absolute magnitude of the acceleration. These characteristics are provided by the device shown in FIG. 3 which may be referred to simply as an E-core differential transformer. The device shown in FIG. 6 operates on time proved principles employed in such devices as pressure transducers. The E-core is wound with a primary coil 48 about the center leg 49 and is excited by the oscillator output. Secondary coils 50 and 51 are wound on the outer legs 52 and 53 as shown and connected in opposition. When the armature is in the center position, the flux coupled from the primary coil to each secondary is equal. Under these conditions, the secondary voltages cancel each other exactly, yielding zero output voltage. The armature is normally biased off center position to assure that the output of the transformer will consist of only one phase and will never pass through zero volts. Accordingly, changes from positive to negative acceleration will result in changes in the magnitude of a single phase rather than in shifting from positive to negative phases of the resulting signal.

An armature 54 is attached to the E-core by means of a flat spring 55, which acts both to provide pivot action and restoring force. A pendulum-type weight 56 is attached to the armature 54 to sense lateral or linear acceleration, and the entire assembly is encapsulated in a hermetically sealed case 57 filled with a damping fluid 58. This last precaution is necessary to discourage the excitation of the natural frequency motion of the spring mass system. When the unit is subject to lateral or linear acceleration, a minute tilting of the armature 54 and a corresponding unbalancing of the secondary coil voltages results. This difference between the secondary coil voltages appears at the output and varies quite linearly with acceleration.

The AC voltage from the deceleration sensor is amplified linearly and its output is detected in a conventional manner. This provides a DC signal level proportional in voltage to linear deceleration magnitude. In order to accommodate various transformer coupling coefficients, a factory adjusted gain control is inserted in the circuit at this point. By means of this control, a standarized output per unit deceleration can be obtained from the linear deceleration circuit.

In FIG. 7, the output from the linear sensor may be coupled to a primary winding 59 associated with a transformer 60. The transformer 60 has a secondary 61 which is coupled to a full wave rectifier 62. The rectifier 62 consists of diodes 63 and 64 as well as diodes 65 and 66. A capacitor 67 is coupled across the diodes between points 68 and 69, and effectively provides a smoother direct current signal for use in the comparison network to be described.

It is well understood, that the signal appearing at a circuit junction point 70 includes at least a DC signal having an amplitude which is proportional to linear deceleration.

The angular or wheel acceleration or deceleration may be coupled at a circuit junction point 71 through a capacitor 72 to a resistor 73 which is connected to ground at point 74.

Accordingly, there is provided in the circuit of FIG. 7 two signals, both with standardized calibration, which are proportional to wheel deceleration and linear deceleration, respectively, and are equal to each other in non-skid (or non-wheel spin) conditions. To provide a necessary brake control signal, it is necessary only to subtract these two forces from each other arithmetically, which may be done in a simple differential amplifier. The amplifier 75 is for on-off control. It is so arranged that zero output occurs until the wheel signal exceeds the linear signal by a given amount, at which time the brake interrupter actuator is actuated.

Generally, the potentiometer 76 provides for calibration of the linear signal to the base 77 of a transistor 78 of the differential amplifier 75. The offset adjustment is coupled to the emitter 79 of the transistor 78 and includes a potentiometer 80. The potentiometer 80 is coupled to the supply voltage 102 as is a resistor 83 which is coupled to the transistor 78.

The offset adjustment on the emitter of the first amplifier stage provides control over the sensitivity of the device. Normally, this adjustment could be factory performed. It could be performed by garage personnel, however, by placing the desired offset voltage on the test points 85 and 86. With this voltage applied, the brakes should be operated while the offset adjustment is slowly turned. When the controlled brake is heard to release, the offset adjustment control should be locked in position.

The remainder of the differential amplifier is for the purpose of increasing the signal level to the point at which the output driver stage can be forcibly turned "on." This is necessary to provide efficient control of the actuator solenoid which operates pneumatic valving in the power brake system. The second transistor 87 is of an NPN type whereas the first is a PNP type. This arrangement allows simple direct coupling between both these and the following PNP driver stage 88. All stages shown in FIG. 7 normally cut off, the first by the offset control current, and the second by the diode offset in the emitter circuit. The driver stage also will normally incorporate emitter offset. As it consumes substantial current upon activation of the brake controls, the driver stage will not be connected to the regulated supply voltage, but will employ the automobile battery voltage directly. The circuit for proportional control is the same as the above, but with the emitter offset removed and the solenoid replaced by a proportional control device.

The second transistor 87 has a base connection 89 which is coupled to the collector 82 of the transistor 78. Also, the emitter 90 of the transistor 87 is coupled through a diode 91 to the main supply line of the circuit as at 92. The collector of the transistor 87, namely the collector 93 is coupled through a resistor 94 to ground. Similarly, the emitter 79 of the PNP transistor 78 is coupled through a resistor 95 to ground as at the point 96.

The collector 93 of the transistor 87 is connected directly to the base 96 of the transistor 88. The emitter 97 of that transistor is coupled through a diode 98 to ground at a point 99. The solenoid actuator 100 is energized from the collector 101 of the transistor 88, and the entire circuit together with the solenoid actuator is supplied through a pair of terminals 102 to 103.

Figure 8:
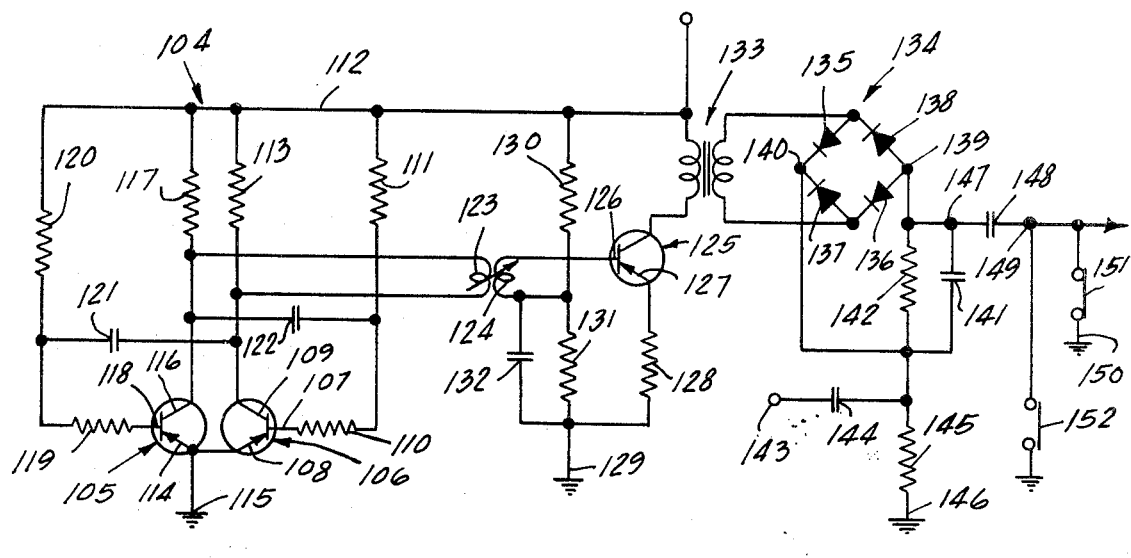
FIG. 8 is a schematic illustrating the operation of a stable oscillator and in general showing the functioning of the linear acceleration network of the present invention as well as showing the use of a control system to prevent the developing of an error signal which may be prejudiced by irregular gravitational effects.

A more detailed description of the linear acceleration sensing circuit is shown in FIG. 8 and includes an oscillator 104. The oscillator 104 is a multi-vibrator type of oscillator which produces symmetrical output voltage waveforms which approximate a square wave. The transistors 105 and 106 in this oscillator are alternately driven from cutoff to saturation, with the consequence that their individual characteristics have little effect upon the output waveform. Hence, the oscillator shown constitutes a stable oscillator.

The transistor 106 includes a base 107, an emitter 108 and a collector 109 with a resistor 110 coupled between the base 107 and a further resistor 111 to a common negative line 112. Also, the collector 109 is coupled through a resistor 113 to the common negative line 112.

Similarly, the transistor 105 has an emitter 114 coupled to ground as at 115. Also, the collector 116 of the transistor 105 is coupled through a resistor 117 to the common negative line 112. In addition, the base 118 is coupled through a resistor 119 and a further resistor 120 to the common line 112. Capacitors 121 and 122 are coupled between the base circuits of one transistor and the collector circuits of the other transistor as is well understood.

Assuming, the transistor 106 to be initially in an "on" condition, the collector 109 will be at a high voltage level. When the transistor 106 turns "off," the collector 109 will drop suddenly causing a negative pulse through the capacitor 121 to turn "on" the transistor 105. When the negative pulse so generated dies out, the transistor 105 will turn "off" thereby generating a negative pulse to the capacitor 122 to turn "on" the transistor 106. Hence, the cycle is repetitive.

The linear differential transformer is shown by the reference numerals 123 and 124 in FIG. 8. The output of the differential transformer is coupled to a transistor 125 at a base 126. An emitter 127 is coupled through a resistor 128 which provides degenerative feedback to stabilize the gain of the transistor 125. The resistor 128 is coupled to ground as at 129. It is noted that a voltage divider consisting of resistors 130 and 131 is provided between the negative line 112 and the ground junction point at 129. Also, a capacitor 132 is brought in between the output coil of the differential transformer and the ground junction point 129.

The output of the amplifier 125 is coupled through a transformer 133 to a full wave rectifier 134. The rectifier 134 consists of diodes 135 and 136 and diodes 137 and 138. The points 139 and 140 of the rectifier 134 are connected by means of a capacitor 141 and a parallel resistor 142.

The rotational or wheel acceleration signal is fed into this circuit at a junction point 143 and through a capacitor 144 and a resistor 145 to ground at the point 146. Hence, both the linear and rotational acceleration DC signals are provided at the junction point 147 in the form of the arithmetic difference of the signals.

A capacitor 148 is coupled between the circuit junction point 147 and the differential amplifier which is utilized in the circuit of FIG. 7 to eliminate effects of the signal on grades or at substantial angles to horizontal. It is necessary to discount effects of gravitational actuation of the linear deceleration transducer. This is accomplished by normally shorting the output signal at the point 149 to ground at the point 150 through a normally closed switch 151. The switch 151 may be connected to the brake pedal or the accelerator pedal in anti-skid brake systems or anti-wheel spin systems, respectively, and is opened only when the brake or the accelerator is employed. In this way, upgrades or downgrades will not affect the output signal as that signal is shorted to ground, and as there is a capacitor 148 connected between the output of the combined sensing point and the differential amplifier. When it is desired to activate the sensing system, the brake pedal or accelerator pedal is depressed, the switch 151 is opened, and instantaneous changes in acceleration will result in a signal which will be passed by the capacitor 148.

The value of the capacitor 148 is sufficiently small so that it does not appreciably load the linear and rotational circuits when the switch 151 is closed. That is, the output voltages of these circuits maintain values very close to their equilibrium levels for any given rotational acceleration value and linear sensor central transformer output. This circumstance allows the comparison circuitry to be continually normalized to zero output until the initial movement of the brake pedal. This normalization occurs before the lash in the brake linkage is taken up, and, therefore, before any braking action takes place. Whether or not the vehicle is on an incline, thereby placing a gravitational signal on the linear sensor, makes no difference. With the normalization feature as just described, comparison of rotational and linear acceleration effectively begins the moment the brake pedal is moved.

A minimal speed lockout device may be employed, and, accordingly, no problem would be anticipated during standing on a grade. A reverse motion lockout should also be supplied, since the above circuitry will otherwise release the rear brakes during reverse braking. These lockout devices can be applied either to the brake release actuator or to the control circuit. If they are to act on the latter, they may conveniently be applied in the form of a normally open switch such as a switch 152 which is parallel with the switch 151. The lockout switch 152 would be closed below a minimum speed and during reverse motion disabling the brake release controller.

It will be understood that the same general provisions as discussed above may be applied to either anti-skid brake devices or to anti-wheel spin devices to prevent the loss of normal operation on grades.

We claim:

1. In a vehicle having wheels for moving on a surface, braking means for retarding the movement of the vehicle wheels, and accelerating means for enhancing the movement of the vehicle wheels, an acceleration control comprising:

means for generating a first electrical signal having a measurable characteristic which is proportional to wheel rotational acceleration, means for generating a second electrical signal having a measurable characteristic which is proportional to vehicle linear acceleration, said means for generating said second electrical signal comprising a stable oscillator for generating an AC signal of constant frequency, a differential transformer coupled to said oscillator, said differential transformer having linear acceleration sensitivity for generating an AC signal having an amplitude which is proportional to vehicle linear acceleration, means for rectifying and averaging said AC signal so produced, thereby developing a DC signal having an instantaneous magnitude proportional to vehicle linear acceleration, means for comparing the measurable characteristics of said first and second electrical signals and for generating a difference signal thereby, and regulatory means responsive to said difference signal for controlling the rotational acceleration of said vehicle wheels.

2. An acceleration control in accordance with claim 1 wherein said differential transformer comprises an E-core portion and a weighted armature portion, said weighted armature portion being spring suspended relative to said E-core portion and being pivotally movable relative thereto by the acceleration of said vehicle, said E-core portion having input and output windings thereon and generating an output signal having a magnitude which is proportional to the deflection of said weighted armature portion relative to said E-core portion.

3. An acceleration control in accordance with claim 2 wherein an input coil is wound about the center leg of said E-core portion of said differential transformer, said stable oscillator being coupled to said input coil, and wherein an output coil being wound in a differential sense about the outer two legs of said E-core portion.

4. In a vehicle having wheels for moving on a surface, braking means for retarding the movement of the vehicle wheels, and accelerating means for enhancing the movement of the vehicle wheels, an acceleration control comprising:

means for generating a first electrical signal having a measurable characteristic which is proportional to wheel rotational acceleration, means for generating a second electrical signal having a measurable characteristic which is proportional to vehicle linear acceleration, means for comparing the measurable characteristics of said first and second electrical signals and for generating a difference signal thereby, said difference signal being capacitively coupled to said regulatory means and wherein the output of said capacitive coupling is normally short circuited from said regulatory means, said normally short circuited capacitive coupling being operatively coupled to said regulatory means by a control motion of an operator of said vehicle, and regulatory means responsive to said difference signal for controlling the rotational acceleration of said vehicle wheels.

5. An acceleration control in accordance with claim 4 wherein said normally short circuited capacitive coupling is operatively coupled to said regulatory means by the application of pressure to said braking means.

6. An acceleration control in accordance with claim 4 wherein said normally short circuited capacitive coupling is operatively coupled to said regulatory means by the application of pressure to said acceleration means.

7. In a vehicle having wheels for moving on a surface, acceleration means for enhancing the movement of the vehicle wheels and braking means for retarding the movement of the vehicle wheels, an acceleration control comprising:

a rotational sensor means for developing a discrete number of pulses having a frequency which is indicative of wheel speed, limiting means for limiting the amplitude of said discrete pulses to a constant value, first detector means for detecting said pulses and for developing the time average value of said pulses,
differentiator means for generating a time differential of said time average value of said pulses,
a stable oscillator means,
a linear sensor means coupled to the output of said stable oscillator for sensing the linear acceleration of the vehicle and for increasing the magnitude of said output of said stable oscillator in proportion to the linear vehicle acceleration, second detector means for generating the time average of the output of said linear sensor means,
differential amplifier means for comparing the output of said second detector means with the output of said differentiator means to develop a difference signal, and
regulatory means utilizing a difference signal so developed to control the acceleration of said wheels.

8. An acceleration control in accordance with claim 7 wherein said rotational sensor comprises a member coupled to a wheel of said vehicle and rotating in proportion with said wheel speed, a serrated-like face distributed substantially 360° around said member, a magnetic sensor fixedly disposed in proximity to said serrated like face and generating an electrical pulse in response to the passing of each serration during the rotation of said member.

9. An acceleration control in accordance with claim 8 wherein said limiting means comprises a saturation amplifier and wherein said first detector means comprises a smoothing filter for generating a DC signal having an amplitude responsive to the frequency of said electrical pulses generated by said rotational sensor.

10. An acceleration control in accordance with claim 9 wherein said differentiator means comprises an RC network coupled to the output of said smoothing filter and wherein the signal developed across the resistor of said RC network is coupled to said differential amplifier for comparison with the output of said second detector means.

11. An acceleration control in accordance with claim 8 wherein said serrated-like face has a relatively large number of closely spaced serrations to permit rapid averaging of the pulses generated by the rotation of said member.

12. An acceleration control in accordance with claim 7 wherein said linear sensor comprises a differential transformer having a pivotally movable weighted armature and wherein the output of said transformer is proportional to the deviation of said armature and wherein said differential transformer is orientated with respect to the forward movement of the vehicle to cause inertial pivotal movement of said armature in response to the linear acceleration of the vehicle.

13. In a vehicle having wheels for moving on a surface and wheel braking means, an anti-skid brake control comprising:
a member coupled to rotate in a fixed proportion to wheel speed,
said member having regularly spaced serration-like projections at the periphery thereof,
rotation sensor means including a fixed reference coil generating a pulse when each of said serrations rotates past said fixed reference coil,
means for limiting the amplitude of pulses generated by said rotation sensor to a constant value,
detector means for generating DC signal having an instantaneous amplitude which is proportional to the frequency of pulses generated by said rotation sensor,
means for producing the time differential of said DC signal oscillator means,
a linear deceleration sensor coupled to the output of said oscillator means and being mounted on said vehicle to sense the linear deceleration thereof,
said linear deceleration sensor having means for changing the magnitude of the output of said oscillator in proportion to the linear deceleration of said vehicle,
means for detecting the time average of the output of said linear deceleration sensor,
a differential amplifier having means for algebraically adding said time differential signal to the time average output of said linear deceleration sensor and having means for developing a control signal in response to the amplification of the algebraic sum of said signals,
actuation means responsive to said control signal where the absolute value of said time differential signal exceeds by a predetermined amount the absolute value of said time average output of said linear deceleration sensor, and
said actuation means being coupled to said wheel braking means for releasing the same until said time differential signal falls to a value not in excess of said time averaged output of said linear deceleration sensor by a predetermined amount.

14. An anti-skid brake control in accordance with claim 13 wherein the algebraic sum of said time differential signal and said time averaged output of said linear amplifier are capacitively coupled to the amplification stage of said differential amplifier and wherein switch means are provided to short circuit the output of said capacitive coupling, said switch means being normally closed and being opened by the application of pressure to said braking means.

15. An anti-skid brake control in accordance with claim 13 wherein said differential amplifier has an offset adjustment for predetermining the magnitude of said algebraic sum required to trigger the amplification stage of said differential amplifier.

16. In a vehicle having wheels for moving on a surface, acceleration means for enhancing the movement of the vehicle wheels and braking means for retarding the movement of the vehicle wheels, an acceleration control comprising:
first sensor means for generating an AC signal having a frequency which is a high multiple of the wheel rotation frequency, means for developing a first time average signal having an amplitude which is proportional to the output frequency of said first sensor means,
second sensor means for generating an AC signal having an amplitude which is proportional to vehicle linear deceleration, means for developing a second time average signal frequency having an amplitude which is proportional to the output frequency of said second sensor means,
means for comparing said first and second time averaged signals and for developing a difference signal thereby, and regulatory means responsive to said difference signal for controlling the rotational acceleration of said vehicle wheels.

17. In a vehicle having wheels for moving on a surface, an acceleration system for enhancing the movement of the wheels and a braking system for retarding the movement of the wheels, the method of controlling the ratio of the angular acceleration of the vehicle wheels to the linear acceleration of the vehicle comprising the steps of:
developing a repetitive pulse train having a frequency which is a relatively high multiple of the rotational frequency of the vehicle wheels, limiting the amplitude of said pulse train, averaging the pulse train over a time interval,
developing an AC signal having an amplitude which is proportional to the acceleration of the vehicle and having a fixed frequency, rectifying and averaging said AC signal over a time interval, algebraically adding the averaged pulse train instantaneously with the averaged AC signal and generating a difference signal therefrom,
utilizing the difference signal so acquired as a means for regulating the acceleration of the vehicle wheels.

18. The method in accordance with claim 17 including the steps of rendering the algebraically added signals normally inoperative, and causing said algebraically added signal to be operative during selective comparison required time intervals.

References Cited
UNITED STATES PATENTS

| | | | |
|---|---|---|---|
| 3,022,114 | 2/1962 | Sampietro | 303—21 |
| 3,026,148 | 3/1962 | Ruof | 303—21 |
| 3,233,946 | 2/1966 | Lockhart | 303—21 |
| 3,260,555 | 7/1966 | Packer | 303—21 |
| 3,292,977 | 12/1966 | Williams | 303—21 |
| 3,362,757 | 1/1968 | Marcheron | 303—21 |
| 3,401,984 | 9/1968 | Williams et al. | 303—21 |

DUANE A. REGER, Primary Examiner

U.S. Cl. X.R.

188—181